United States Patent [19]
Schoyer

[11] Patent Number: 5,753,915
[45] Date of Patent: May 19, 1998

[54] ARRANGEMENT AND METHOD FOR THE DETECTION OF TARGETS

[75] Inventor: Marnix Karel Nico Schoyer, Hengelo, Netherlands

[73] Assignee: Hollandse Signaalapparaten B.V., Hengelo, Netherlands

[21] Appl. No.: 717,723

[22] Filed: Sep. 23, 1996

[30] Foreign Application Priority Data

Oct. 20, 1995 [NL] Netherlands ............... 1001459

[51] Int. Cl.⁶ .................. G01S 17/66; G01S 17/02
[52] U.S. Cl. ................... 250/342; 250/203.6
[58] Field of Search ................. 250/342, 332, 250/334, 203.1, 203.6, 347, 349

[56] References Cited

U.S. PATENT DOCUMENTS

| | | | |
|---|---|---|---|
| 4,675,532 | 6/1987 | Carson | 250/334 X |
| 5,014,131 | 5/1991 | Reed et al. | 250/334 X |
| 5,025,143 | 6/1991 | Dayhoff | |
| 5,027,413 | 6/1991 | Barnard | 250/332 X |
| 5,308,984 | 5/1994 | Slawsby et al. | 250/342 |
| 5,416,326 | 5/1995 | Andreotti | 250/334 X |

FOREIGN PATENT DOCUMENTS 0 346 985 A2   12/1989   European Pat. Off. .

*Primary Examiner*—Edward J. Glick
*Attorney, Agent, or Firm*—Oblon, Spivak, McClelland, Maier & Neustadt, P.C.

[57] ABSTRACT

The invention relates to an arrangement and a method for suppressing spurious targets, particularly those caused by birds, in an infrared search device. Potential targets that show comparatively strong fluctuations are qualified as spurious targets. Only targets moving against a homogeneous background are subjected to an evaluation.

3 Claims, 1 Drawing Sheet

ARRANGEMENT AND METHOD FOR THE DETECTION OF TARGETS

BACKGROUND OF THE INVENTION

1. Field of the Invention

The present invention relates to an arrangement for detecting targets such as aircraft and missiles by means of infrared radiation, comprising a detector unit, provided with at least one detector for detecting radiation emitted or reflected by potential targets, and a target extractor connected to the at least one detector, provided with means for suppressing spurious targets.

The invention furthermore relates to a method for detecting targets such as aircraft and missiles, in accordance with which information on a surrounding area is obtained by means of at least one detector, and infrared radiation emitted or reflected by potential targets is received by at least one detector to be subsequently transmitted to the target extractor in the form of target strengths and target positions in order to suppress spurious targets.

2. Discussion of the Background

Arrangements of this type generate a considerable quantity, sometimes even thousands, of false alarms per revolution, which limits their applicability as automatic detector, for instance coupled to a weapon system.

SUMMARY OF THE INVENTION

In order to identify and eliminate spurious targets, use is often made of extremely sophisticated methods based on spectral differences, differences as a result of parallax and filtering methods for assessing the target size. Compared to this, the arrangement and method according to the invention are of considerable simplicity, although they are nevertheless found to be quite effective. Especially spurious targets caused by birds are nearly always identified as such by the arrangement. An additional substantial advantage is that use can be made of target strengths already available in prior art arrangements. These target strengths have for instance been obtained by means of a point target extractor known in the art. The invention is thereto characterized in that the means are arranged for comparing the target strengths of potential targets, as successively obtained by the at least one detector, and for qualifying a target as a spurious target on the basis of this comparison. Per potential target, this comes down to processing a small series of numbers, which constitutes a considerable improvement on the above-mentioned known methods.

The invention is based on the observation that for birds the emitted or reflected infrared radiation shows relatively strong fluctuations. Although this phenomenon is partly due to the flight movements of the birds, the continuously changing aspect angle at which specifically the birds' feathers are observed, chiefly accounts for these fluctuations. An advantageous embodiment of the invention that makes use of these fluctuations is therefore characterized in that the means are arranged for determining, per potential target, a standardized spread value on the successively obtained target strengths and for qualifying a target as a spurious target when the standardized spread value exceeds a preselected value.

Owing to imperfections in the detector, the corresponding optical means and in the point target extractor, a true target may seem to fluctuate strongly, particularly if this target is observed against a strongly fluctuating background, for instance an edge of a sunlit cloud or water reflecting sunlight. This could cause the target to be taken for a spurious target, which, in view of the nature and application of the arrangement, will usually have serious implications.

A further advantageous embodiment of the invention is therefore characterized in that the means are also arranged for estimating a background strength for each potential target and that the means are arranged for determining, per potential target, the standardized spread value on the successively obtained target strengths, insofar as the background strengths relating to these target strengths are at least substantially identical.

A still further advantageous embodiment of the invention is characterized in that at least one detector is arranged for detecting infrared radiation having a wavelength of 3–5 micron.

The inventive principle is also embodied in the above-described method, which is characterized in that the target extractor may qualify targets as spurious targets on the basis of the successively obtained target strengths.

An advantageous embodiment of the inventive method is characterized in that the target extractor determines a standardized spread value for a series of successively obtained target strengths and qualifies a potential target as a spurious target when the standardized spread value exceeds a predetermined value.

A still further advantageous embodiment of the inventive method is characterized in that the standardized spread value is determined for a series of successively obtained target strengths of which the associated background strengths are at least substantially identical.

BRIEF DESCRIPTION OF THE DRAWINGS

The invention will now be explained in greater detail with reference to the following figures, of which.

DESCRIPTION OF THE PREFERRED EMBODIMENTS

Figure 1:
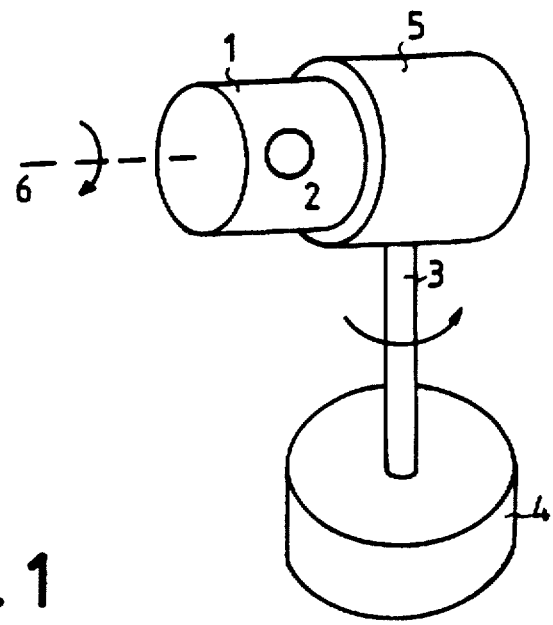
FIG. 1 represents a feasible embodiment of the detector unit.

FIG. 1 represents a possible embodiment of a detector unit 1, as incorporated in the arrangement according to the invention. Detector unit 1 is provided with optical means 2, which will generally be a system of lenses, behind which a detector is placed, shaped as a linear array, to receive radiation emitted or reflected by potential targets. During operation, detector unit 1 rotates about a vertical search axis 3 which ends in a pedestal 4. If the invention is used on a ship, pedestal 4 is generally implemented as a stabilized platform, so that ship's motions substantially do not adversely affect the operation of the arrangement. As the angle of aperture of the detector will usually be limited, it may be of advantage to accommodate detector 1 in a drive 5, so that it is capable of rotation about elevation axis 6; this enables a wider elevation angle to be sequentially scanned.

Figure 2:
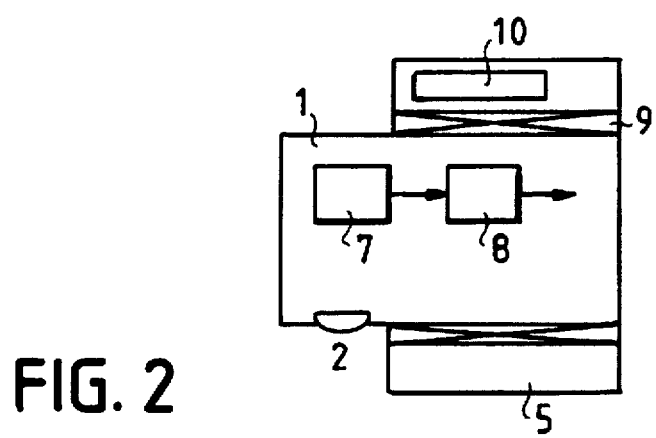
FIG. 2 represents a block diagram of a feasible implementation of the detector unit.

FIG. 2 represents a block diagram of a possible implementation of detector unit 1, indicating also optical means 2, a detector 7 and a preprocessor 8. Preprocessor 8 comprises functions known in the art, such as the preamplification and filtering of signals generated by detector 7 as well as the A/D conversion and multiplexing of these signals to enable their transport through the rotary joint to a below-deck target extractor. Also shown is a bearing 9 in which detector unit 1 may rotate and an associated elevation drive 10.

Figure 3:
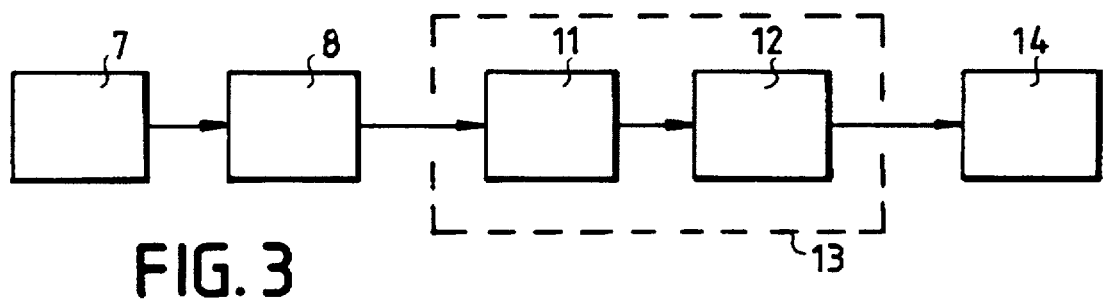
FIG. 3 represents a block diagram of a feasible implementation of the arrangement.

FIG. 3 represents a block diagram of a possible implementation of the invention with detector 7 applying, via preprocessor 8, signals to a point target extractor 11 which generates potential targets, in which process are generated, per potential target, at least one target strength, one background strength, one elevation value and one azimuth value, in a manner known in the art. These target parameters are subsequently applied to a track unit 12 well-known in the art, which, in a manner kwown in the art, generates tracks from these. Point target extractor 11 and track unit 12 together constitute target extractor 13 which passes the track data associated to both true and potential targets to an information system 14 for further processing.

The object of the invention is to use target extractor 13 for verifying which tracks are related to spurious targets and to birds in particular and to prevent the related track data from being transferred to information system 14. These tracks are updated, though, in target extractor 13 to prevent a bird from continuously initiating a new track. In order to determine whether a track is caused by bird activity, the standardized spread value is determined for the track concerned. This standardized spread value is compared with a threshold value which is determined per installation and possibly dependent on the operational conditions. If the standardized spread value exceeds the threshold value, which consequently is indicative of a strongly fluctuating target, the track is found to be caused by a bird. A true target, especially an incoming missile, is known to have a small standardized spread value.

With respect to a potential target moving against a homogeneous background, it can in this way always be determined whether a bird is involved. A true target moving against a strongly fluctuating background may sometimes be taken for a spurious target, which is probably due to imperfections in optical means 2 or detector 7. For that reason it is preferable to also involve a target's background in the decision process. To establish if a track is caused by a bird, the standardized spread value on successively obtained target strengths is again determined for the track in question only if the background strengths relating to these target strengths are practically constant. In practice, this means that a row of successive target strengths relating to a potential target is sometimes in part useless, which may occasionally slow down the decision process. More precisely: a reliable decision process is possible only if a row of at least five successive target strengths is available, on condition that the backgrounds relating to these target strenghts hardly fluctuate.

The fluctuations of the background can for instance be determined by calculating a standardized spread value for these background strengths.

In conclusion it should be noted that the invention is also suitable for arrangements where detector 1 does not rotate about a search axis, for instance a staring array known in the art. Use is also made here of successively obtained target strengths for a potential target and a standardized spread value may consequently be determined analogously.

I claim:

1. Arrangement for detecting targets by detecting infrared radiation, comprising a detector unit, provided with at least one detector for detecting radiation emitted or reflected by potential targets and a target extractor connected to the at least one detector, provided with means for suppressing spurious targets, said suppressing means are arranged for mutually comparing target strengths of potential targets, as successively obtained by the at least one detector and for qualifying a target as a spurious target on the basis of this comparison, said suppressing means are arranged for determining, per potential target, a standardized spread value on the successively obtained target strengths and for qualifying a target as a spurious target if the standardized spread value exceeds a preselected value and said suppressing means are also arranged for estimating a background strength for each potential target, characterized in that said suppressing means are arranged for determining, per potential target, the standardized spread value on successively obtained target strengths, insofar as the background strengths relating to the these target strengths are at least substantially identical.

2. Arrangement as claimed in claim 1, characterized in that the at least one detector is arranged for detecting infrared radiation having a wavelength of 3-5 micron.

3. Method for detecting targets by detecting infrared radiation, comprising the steps of: obtaining information on a surrounding area by means of at least one detector; receiving radiation emitted or reflected by potential targets by the at least one detector; and transmitting the information to a target extractor in the form of target positions and target strengths in order to suppress spurious targets, which target extractor qualifies targets as spurious targets on the basis of successively obtained target strengths and which target extractor determines a standardized spread value on successively obtained target strengths and qualifies a potential target as a spurious target if the standardized spread value exceeds a predetermined value, characterized in that the standardized spread value is determined for a series of target strengths of which the associated background strengths are at least substantially identical.

* * * * *